United States Patent [19]
Fu et al.

[11] 3,754,838
[45] Aug. 28, 1973

[54] VIBRATION-SUPPRESSED BLADE

[75] Inventors: Chuen-Cheng Fu, North Brunswick; Mukund D. Gangal, Princeton, both of N.J.,

[73] Assignee: Ingersol-Rand Company, Woodcliff Lake, N.J.

[22] Filed: Nov. 15, 1971

[21] Appl. No.: 198,756

[52] U.S. Cl............................. 416/145, 416/500
[51] Int. Cl............................................ F01d 5/26
[58] Field of Search.................. 416/144, 145, 500

[56] References Cited
UNITED STATES PATENTS

| | | | |
|---|---|---|---|
| 2,349,187 | 5/1944 | Meyer | 416/190 |
| 2,426,130 | 8/1947 | Wald | 416/145 |
| 2,435,604 | 2/1948 | Rorden | 416/144 |
| 2,462,962 | 1/1949 | Harker | 416/500 X |
| 2,984,453 | 5/1961 | Heymann | 416/500 X |

FOREIGN PATENTS OR APPLICATIONS

| | | | |
|---|---|---|---|
| 1,024,218 | 1/1953 | France | 416/500 |
| 1,254,270 | 1/1961 | France | 416/500 |
| 293,099 | 2/1932 | Italy | 416/145 |

*Primary Examiner*—Everette A. Powell, Jr.
*Attorney*—Frank S. Troidl

[57] ABSTRACT

A blade operative in a fluid environment and, therefore subject to vibration, has inertially-responsive weights movably mounted therein to impact on blade surfaces during vibration to dissipate the vibration energy.

In a first embodiment, the invention comprises a pair of inertially-responsive weights mounted to either ends of a shaft for relatively slidable movement within a cross-section of the blade. In an alternate embodiment of the invention, a pair of inertially-responsive weights are coupled to opposite ends of a resilient shaft which is disposed through the cross-section of the blade, and the weights swing about an arc to impact on blade surfaces to dissipate the vibration energy.

1 Claim, 5 Drawing Figures

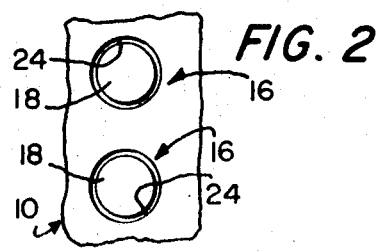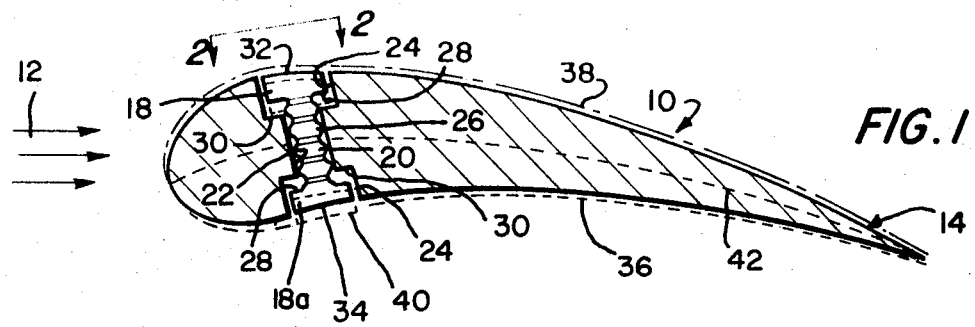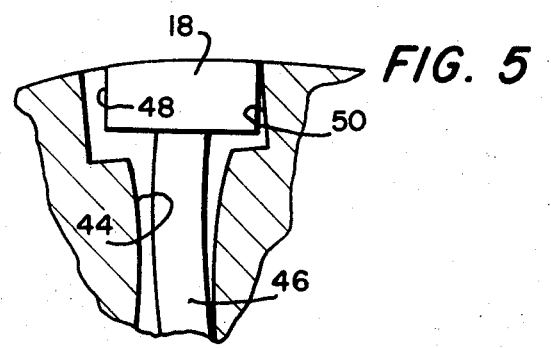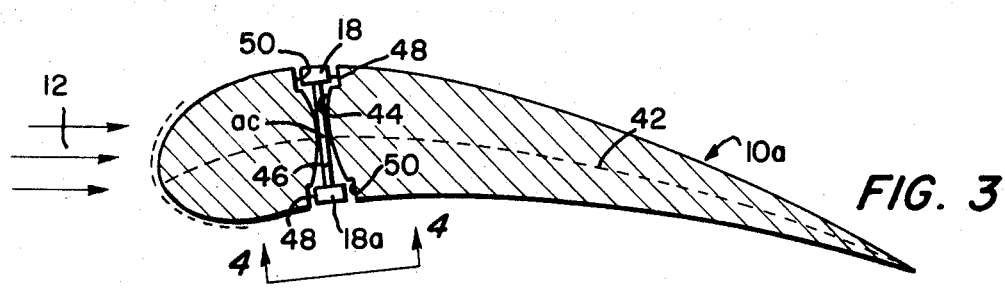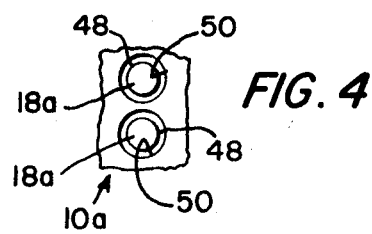

VIBRATION-SUPPRESSED BLADE

This invention pertains to blades which are operative in a fluid, such as airfoils used with aircraft, turbine blades, impellers used in pumps and the like, and in particular to a blade, operative in a fluid, which has vibration-suppression means.

It is already known from the prior art to damp or otherwise suppress blade vibration, for instance, in turbine applications, by using lashing wire. However, the lashing wire practice causes appreciable aerodynamic losses in the machine resulting in a diminution of machine efficiency. So also, the lashing wire practice is somewhat involved, in that the wire must be secured to some external, rigid member.

It is an object of this invention, therefore, to teach means for suppressing blade vibration which requires no coupling external of the blade. It is another object of this invention to set forth a vibration-suppressed blade comprising a blade, and vibration-suppressive means coupled to only said blade reactively-operative, in response to vibration of said blade, to suppress the vibration thereof.

A feature of this invention, in one embodiment, comprises the disposition of a pair of weights on opposite ends of a rigid shaft which shaft is slidably moveable through the blade cross-section. The weights automatically make an inertial response to blade vibration and, as a consequence, impact on a blade surface to suppress the vibration energy.

Further objects and features of this invention will become more apparent by reference to the following description, taken in conjunction with the accompanying figures in which:

FIG. 1 illustrates a turbine blade, in cross-section, with a first embodiment of the novel vibration-suppressing means installed within same;

FIG. 2 is a fragmentary plan or top view of the FIG. 1 structure;

FIG. 3 is an alternate embodiment of the invention, also arranged in a turbine blade;

FIG. 4 is a fragmentary view of the underside of the blade of FIG. 3; and

FIG. 5, in a partial view, depicts a dynamic, operative disposition of a portion of the vibration suppressing means of the embodiment of FIGS. 3 and 4.

As shown in FIG. 1, a turbine blade 10 defines an airfoil which is disposed within a relatively movable fluid represented by the arrows 12. The blade has a camber surface 14, and is shown in cross-section. The vibration-suppression means 16, according to this embodiment of the invention, comprises a pair of inertially-responsive weights 18 and 18a which are fixed to opposite ends of a rigid shaft 20.

Shaft 20 is slidably disposed within a borehole 22 formed therefor in blade 10. The external, outer ends of the borehole have enlarged recesses 24 formed therein in which to accommodate the weights 18 and 18a. Shaft 20 has a plurality of spaced-apart circumferential ribs 26 formed thereabout for inhibiting the incidence of friction from the movement of the shaft 20 relative to the borehole 22. The diameter of the ribs 26 is such that the ribs make light contact with the inside walls of the borehole 22. The vibration-suppression means 16, therefore, is but loosely held in borehole 22.

The weights 18 and 18a have impacting surfaces 28 disposed for impacting contact with shouldered surfaces 20 of the recesses 24. In order to reduce aerodynamic losses, weight 18 has a positive cambered outer surface 32 and weight 18a has a negative-camber outer surface 34. These surfaces are so configured to complement the aerodynamic airfoil.

In dashed outline 36, and dash-dot outline 38, are depicted the "oscillation" limits of vibration (by way of exaggeration) illustratively to simulate the excursions through which the blade 10 will go during vibration. According to our inventive teaching, when the blade 10 moves in an excursion to the limit depicted by line 38, the vibration-suppression means 16, due to its inertia, will be relatively displaced to the positioning shown in outline 40. Therefore, the novel means 16 is relatively movable in a plane transverse to the mean camber line 42 of the blade. In this relative movement or displacement between blade 10 and means 16, as blade 10 proceeds to assume the positioning of outline 38, the impacting surface 28 of weight 18 moves inwardly and, in being delimited in movement by shouldered surface 30, impacts the latter surface and suppresses the vibration energy. As shown in FIG. 2, a plurality of the means 16 can be deployed throughout the length of the blade, optionally.

An alternate embodiment of the invention is shown in FIG. 3 where a vibration-suppression means 16a is fixed in a borehole 44. Borehole 44 widens externally and narrowly internally. Mid-way along the length, a flexible shaft 46 disposed within the borehole is securely held thereat. Weights 18 and 18a, fixed to opposite ends of shaft 46, swing through an arc in response to vibration of blade 10a. If, due to vibration, blade 10a makes a forwardly-directed excursion to the dashed-line positioning shown before the leading edge, the weights will assume a relatively rearward positioning. As shown in FIG. 4, again, several installations of the means 16a can be placed along the length of the blade 10a.

In FIG. 5, it is more clearly seen that shaft 46 defines a resilient means secured at the aerodynamic center "ac" of the blade, and it is about this center which the weights 18 and 18a swing through an arc. The impacting surface 48 of the weights forceably impact annular surfaces 50 formed in the blade 10a to dissipate the vibration energy.

While we have described our invention in connection with specific embodiments thereof, it is to be clearly understood that this is done only by way of example and not as a limitation to the scope of our invention as set forth in the objects thereof and the appended claims.

We claim:

1. A vibration-suppressed blade comprising:
   a blade; and
   vibration-suppressive means coupled to only said blade, reactively operative in response to vibration of said blade to dissipate said vibration; wherein
   said vibration-suppressive means includes a plurality of weights and resilient means coupling said weights together;
   said blade comprises an airfoil;
   said airfoil has a borehole formed therethrough;
   said borehole having enlarged recesses formed thereabout at either ends thereof;
   said coupling means comprise a resilient shaft;
   said weights are coupled to each end of said shaft;
   said shaft is securely held in said borehole at the aerodynamic center of said airfoil; and
   said weights describe an arc about said center, during blade vibration, and impact with blade surfacing to suppress blade vibration.

* * * * *